United States Patent [19]

Garwin et al.

[11] 4,324,020
[45] Apr. 13, 1982

[54] MUSSEL WASHER

[76] Inventors: Richard L. Garwin, 16 Ridgecrest East, Scarsdale, N.Y. 10583; Harold L. Friedman, 90 Old Field Rd., Setauket, N.Y. 11733

[21] Appl. No.: 152,233

[22] Filed: May 22, 1980

[51] Int. Cl.$^3$ .............................................. A22C 29/04
[52] U.S. Cl. .......................................... 17/51; 17/53; 17/65; 17/64
[58] Field of Search .................... 17/65, 74, 64, 51, 71, 17/73, 53

[56] References Cited

U.S. PATENT DOCUMENTS

| 71,434 | 11/1967 | White | 17/65 X |
| 477,134 | 6/1892 | MacQueen | 17/53 |
| 3,095,601 | 7/1963 | Wier, Sr. | 17/64 |

FOREIGN PATENT DOCUMENTS 643383  5/1928  France ..................................... 17/65

*Primary Examiner*—Willie G. Abercrombie
*Attorney, Agent, or Firm*—Townsend and Townsend

[57] ABSTRACT

Apparatus for cleaning mussels and other shellfish which can be used floating on the surface of the water from which the shellfish were taken is disclosed. A container, typically a 5-gallon can, has a great number of holes formed in its circumferential surface. The container is supported within a basin of water, typically on a body of water by a pair of bouyant rings, so that a portion of the container lies below the surface of the water thereby allowing the water to enter and exit the container through the holes in the surface of the container. A door is provided in the container for the insertion and removal of the mussels. The interior surface of the container is interrupted, typically by a plurality of vanes or ribs formed on the interior surface of the container, so that when the container is rotated, typically by a hand crank attached to one end of the container, the mussels are drawn part way up the side of the container before tumbling back upon themselves. This mutual abrading action between the shellfish, as well as the abrading action between the container and the shellfish, causes the attached sand, seaweed, and other debris to become loosened from the mussels. The loosened debris is simultaneously washed out through the holes in the container back into the water. The basin of water, in addition to supporting the container in the preferred embodiment, provides a constant source of clean water with which to rinse the shellfish as they are being cleaned.

18 Claims, 3 Drawing Figures

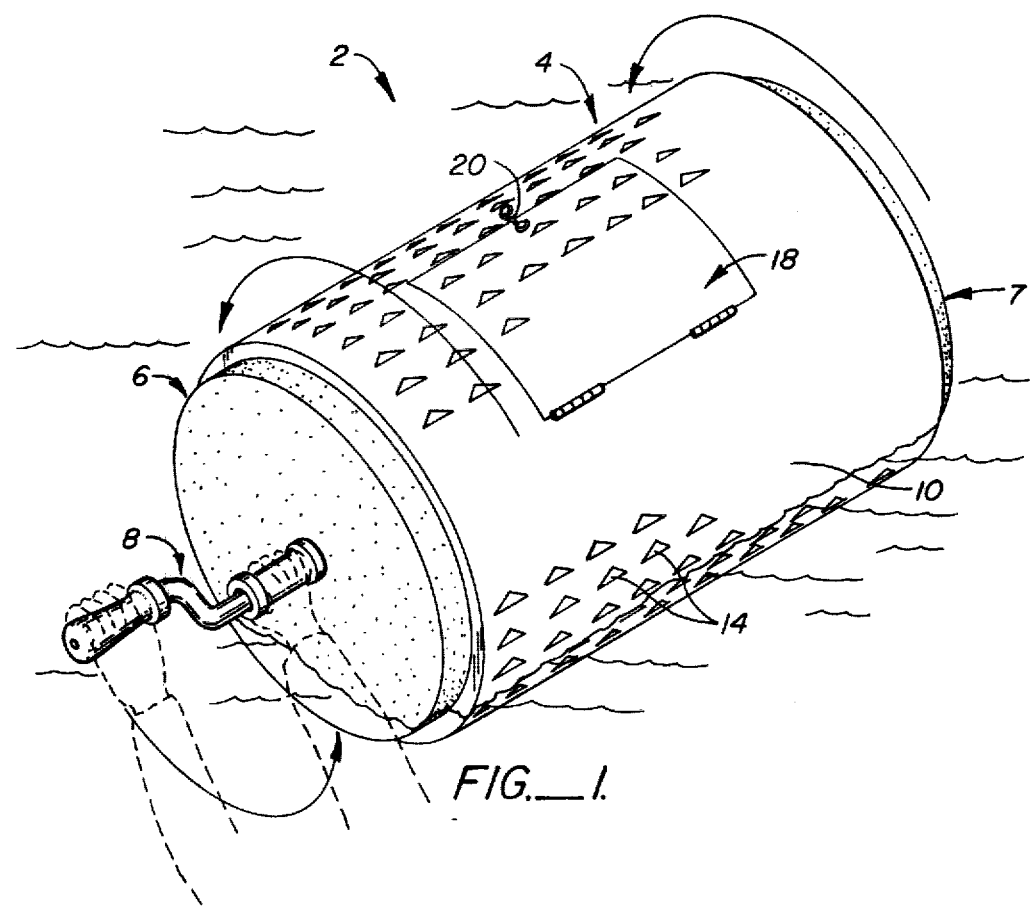
FIG.__1.
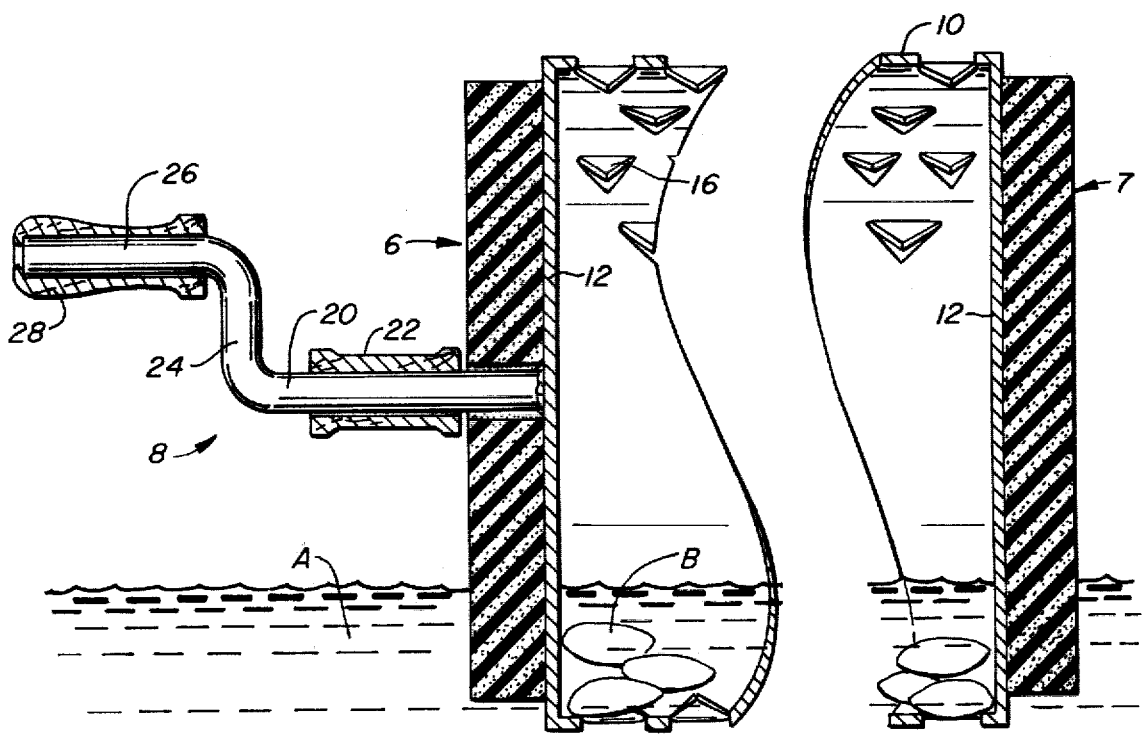
FIG.__2.

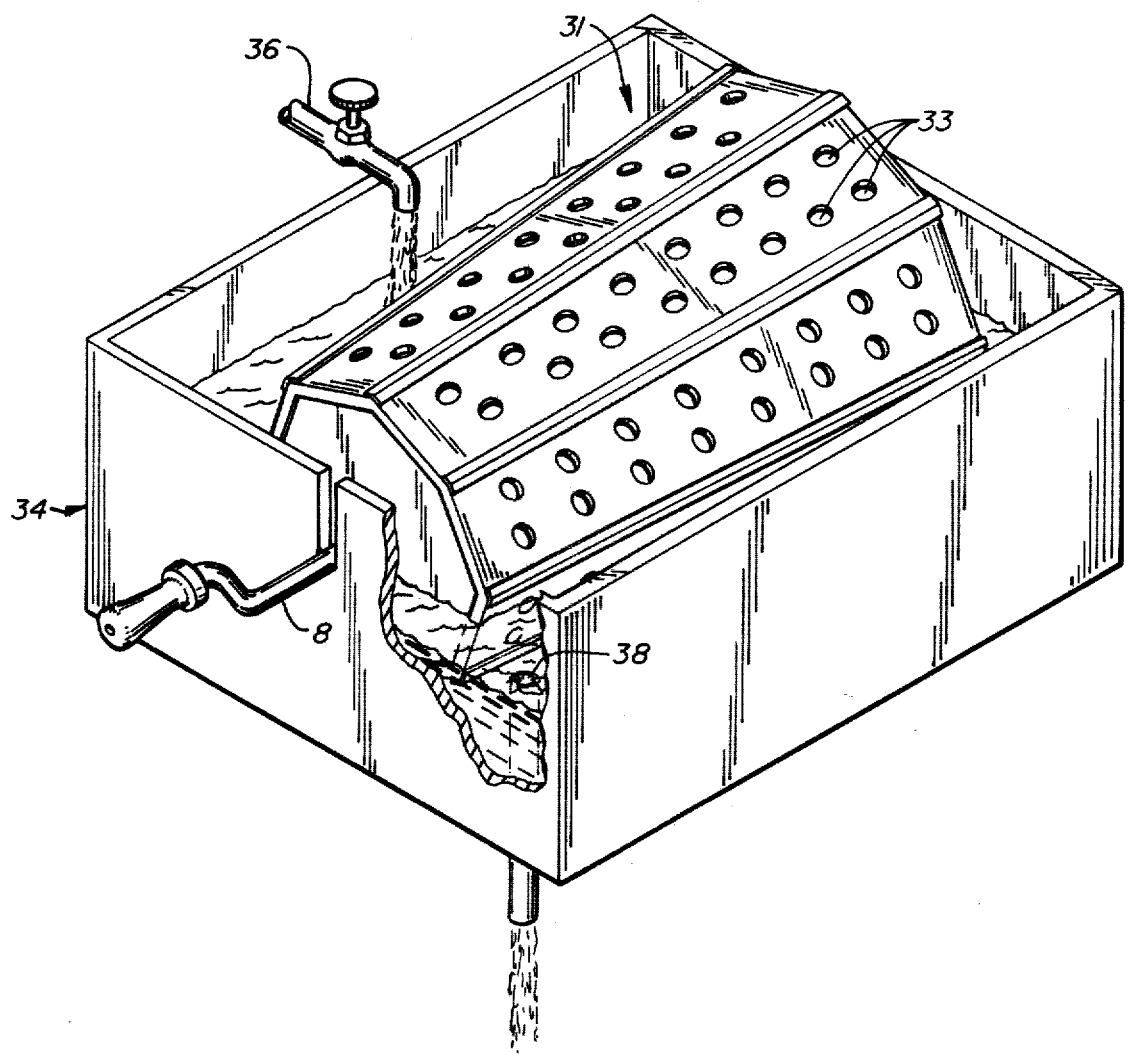
FIG._3.

MUSSEL WASHER

This invention is related to cleaning apparatus, particularly of the type which tumble the objects to be cleaned within a rotating container.

BACKGROUND OF THE INVENTION

In many areas of the world it is popular to gather various shellfish, such as mussels, from a body of water such as a bay. One of the problems constantly facing persons who gather these shellfish is the onerous job of cleaning them. Although certain types of bivalves do not require much cleaning before they are used, many others, particularly edible mussels, collect a great deal of muck, barnacles, and other debris on the outside of their shells, and sand inside. Cleaning the mussels before use is important regardless of whether the mussels are steamed or if they are removed from the shell prior to cooking. In either case, the existence of seaweed and sand can ruin any broth produced and the seafood dish intended to be made. Although cleaning mussels which have been gathered from the bottom of a bay has been an unpleasant task, many people feel the gastronomical rewards justify the efforts taken to clean them.

SUMMARY OF THE INVENTION

The present invention solves the major drawback of collecting fresh mussels by providing apparatus which simply and relatively quickly cleans the collected debris from their outer surfaces and effectively flushes their interior.

A container, typically a 5-gallon can, has a great number of holes formed in its circumferential surface. The container is supported to be partly immersed within a basin of water. In the preferred embodiment the basin is the body of water from which the mussels were gathered and the support is via a pair of bouyant rings, typically made of styrofoam. The rings are mounted at either end of the container and are sized so that the container floats on the surface of the water with a portion of the container disposed below the surface of the water. Water enters the interior of the container and into contact with the mussels contained therein through the holes in the surface of the container. A door is provided in the container for the insertion and removal of the mussels. The interior surface of the container is interrupted, typically by a plurality of vanes or ribs formed on the interior surface of the container, so that when the container is rotated within the water, such as by a hand crank attached to one end of the container, the mussels are drawn part way up the side of the container before tumbling back upon themselves. This mutual abrading action between the shellfish, as well as the abrading action between the container and the shellfish, causes the attached sand, seaweed, barnacles and other debris to become loosened from the mussels. The loosened debris is simultaneously washed out through the holes in the container back into the body of water as the container is rotated. The body of water, in addition to supporting the container, provides a constant source of clean water with which to rinse the shellfish as they are being cleaned.

An object of the present invention is to provide an apparatus in which the perforated rotating container is partly immersed within a water bath, the water bath acting as the source of water for cleaning the mussels. This aspect of the invention eliminates the need for elaborate fluid transport systems, sprayers, or the like. One merely needs a basin of water in which the perforated drum is supported to lie partly immersed and rotated therein.

A further object of the present invention is to provide an apparatus which can be used on the surface of the same body of water from which the mussels were taken to clean the mussels. This allows the mussels to be cleaned immediately after gathering and in the same location from whence they came. No separate source of cleaning water is needed.

Another object of the present invention is to provide a mussel cleaner which rotates thereby causing the enclosed mussels to mutually abrade, thus cleaning and polishing the shells. No special cleaning or abrading agents need be used and only that which is naturally within the body of water is returned to the water during the cleaning.

A still further object is to disclose a mussel washer which is inexpensive to manufacture, easy to use, light in weight and easily transportable. It is therefore very conducive for use by individuals to quickly and thoroughly clean the mussels which they have gathered.

Other objects, features and advantages of the present invention will appear from the following description in which the preferred embodiment has been set forth in detail in conjunction with the accompanying drawings.

BRIEF DESCRIPTION OF THE DRAWINGS

FIG. 1 is an isometric view of the preferred embodiment shown floating on a body of water and being rotated by a user.

FIG. 2 is a foreshortened cross-sectional view of the embodiment shown in FIG. 1.

FIG. 3 is an isometric view of an alternative embodiment having the drum mounted within a tank.

DETAILED DESCRIPTION OF THE PREFERRED EMBODIMENT

Generally the mussel washer 2 of the present invention comprises a drum 4, which drum has a pair of foam flotation disks 6, 7 attached at either end of the drum. A crank 8 extends from one end of the drum and is used to rotate the drum while the drum floats on a surface of a body of water A. Although the present invention is suitable for cleaning many different types of bivalves, the preferred embodiment will be described in terms of mussels.

As shown in the FIGS. 1 and 2, the drum is a generally cylindrical container having a perforated outer circumference 10 and solid circular ends 12. A great number of openings 14 are formed in outer circumference 10. The triangular shaped openings are formed so that like triangularly shaped tabs project inwardly into the interior of the drum. These inwardly disposed tabs act to draw the mussels B up the side of the interior of the drum as the drum is rotated so that a tumbling, abrading process occurs among the mussels thereby cleaning and polishing the shells. The mussels are introduced into the interior of the drum and removed from the drum through a door 18. A latch 20 keeps the door from inadvertently opening during use.

Although in the preferred embodiment a drum is a metallic drum and the tabs are formed from the outer circumference of the drum, other materials may be used and other methods for forming the tabs may be employed. For example, the drum may be made of plastic having vanes molded to the inside surface of the container and a plurality of circular openings formed through its side. Although the container of the preferred embodiment has a cylindrical shape for ease of turning and to facilitate manufacture, other shapes can be used. For example, an eight-sided container could be employed, however not without increasing the drag which would be created as the container was rotated through the water and increasing the propensity to splash.

It has been found that it is not always necessary to include inwardly extending vanes for proper tumbling of the mussels. Other types of interior surface interruptions can cause the mussels to do so with varying degrees of severity. For example, merely providing holes in a circular drum, the holes of a proper size relative to the mussels, will cause the mussels to be drawn part way up the side of the container before falling back upon their fellows. Also, a change of interior curvature, such as that which occurs using an octagonal container, can also provide proper tumbling. Both of these methods have their drawbacks. Using the hole size to draw up the mussels necessarily somewhat restricts the range of different-sized bivalves which may be cleaned in a single drum. As noted above, a polygonal container increases drag and causes some splashing in use.

The size, placement and number of openings and tabs are chosen for optimal operation of the apparatus. The openings must be large enough to allow clean water to freely pass into the drum and also allow dirty water and dislodge debris, such as seaweed and sand, to exit the drum. However, the openings should not be so large as to allow the mussels, or the other bivalves to be cleaned, to fall out of the drum. The size and number of the tabs are chosen depending on the size of the drum, the type and size of mussels to be cleaned, and the quantity of mussels to be cleaned at a single time.

The drum with the mussels therein is turned while floating on the surface of water A. Flotation is provided by foam disks 6,7 attached to the outside of the ends of the drum. It has been found that when a 5-gallon drum is used, effective cleaning is accomplished when a fraction of the drum equal to approximately 30% of the diameter of the drum is submerged.

The drum is rotated in the water by crank 8. The crank is mounted to the center of one end of the drum, typically by welding. Crank 8 is a generally Z-shaped member, the connecting portion 24 being at right angles to the first and second end portions 20, 26. First end portion 20 extends axially from the drum and supports a first rotatable handhold 22. Connecting portion 24 extends radially from the outermost end of the first portion at a right angle therefrom. Second end portion 26 of crank 8 extends at a right angle from the outer end of the connecting portion in a direction away from the drum and supports a second rotatable handhold 28. As shown in FIG. 1, the user typically grasps first and second handholds and turns the second end portion of the crank, thereby causing the drum to rotate in the water. If it is desired to make connecting portion 24 longer, thus increasing the torque arm, the diameter of disk 7 may be decreased so that the handle extends away from, rather than parallel to, the water. The drum should thus have a truncated conical shape. Instead of the door 18, a removable drum end may be used, attachable to the drum in a convenient manner, as by the crank 8 penetrating the entire drum and being held by a peg or snap as it emerges from end 12.

Although the operation of the disclosed embodiment should be apparent, briefly the use of the apparatus proceeds as follows. The user places an appropriate number of mussels, for example three or four gallons of mussels for a five-gallon drum, through the door in the drum. The door is latched and the drum, with the mussels therein, is placed on the surface of the water. The user typically stands in the water and turns the crank at a moderate pace. When the mussels are sufficiently clean, which is indicated by the clarity of the water passing out of the drum, the user removes the apparatus and mussels therein from the water and allows the excess water to drain from the drum. The cleaned mussels can then be removed or transported in the drum as the user desires.

An alternative embodiment is shown in FIG. 3. An eight-sided drum 31 having a plurality of holes 33 formed in its surface is mounted within a tank 34 in a conventional manner via a through-crank using journal bearings (not shown) resting in slots at the sides of the tank. Handle 8 extends past a side of the tank and is used in the normal fashion to rotate the drum within the tank. Wash water is supplied by a faucet 36 and is drained away from the tank by a standpipe 38. The standpipe also regulates the level of the water within the tank. It is apparent that the structure of the alternative embodiment differs from the embodiment described above in the manner in which the drum is supported within the basin of water. This embodiment also lacks the vanes of the above embodiment. Interior surface interruption for drawing the mussles up the side of the drum is provided by the generally flat faces of the eight-sided interior surface of the drum. One end of the drum 33 is removable for access to its interior. The use and operation of the alternative embodiment is similar to that of the preferred embodiment. The water in the tank can be maintained as clean as desired by varying the flow of water from the faucet.

Although preferred and alternative embodiments have been herein shown and described, modification and variation, e.g. providing an electric motor to turn the drum, may be made without departing from what is regarded to be the subject of the invention.

We claim:

1. A shellfish washer, particularly useful for cleaning the outside of bivalve mollusks, such as mussels, for use in conjunction with a body of water comprising:

a container, said container having a plurality of openings within its surface for communication with said water, said openings sized so that shellfish placed within the container do not pass through the holes;

means for supporting said container relative to said body of water, said supporting means comprising floating means fixedly attached to said container and independent of said rotating means for floating said container on the surface of said body of water so that said container is partly submerged within said water and said water enters said container through said openings;

means for rotating said container; and means for carrying the shellfish partially up the side of the container when said container is rotated while supported upon said body of water, the shellfish being lifted up and then dropped back onto other shellfish in the container thus producing mutual abrading cleansing action.

2. The shellfish washer of claim 1 wherein said supporting means includes means for mounting said container within a tank.

3. The shellfish washer of claim 1 including door means for depositing said shellfish within said container.

4. The shellfish washer of claim 1 wherein said rotating means includes a hand crank operably coupled to said container whereby a user rotates said container by turning said crank.

5. The shellfish washer of claim 1 wherein said shellfish are mussels and said openings are sized to retain said mussels within said container and allow abraded debris from the mussels to pass through the openings into the basin of water.

6. The shellfish washer of claim 1 wherein said container has a circular cross-sectional shape.

7. The shellfish washer of claim 1 wherein said container is a cylindrical metal drum.

8. The shellfish washer of claim 1 wherein said container has a truncated conical shape and wherein said container is disposed about an axis to place the lowermost submerged container surface generally parallel to the water surface.

9. The shellfish washer of claim 1 wherein said floating means includes first and second buoyant members mounted at each end of said container to be continuously partially submerged in said body of water.

10. The shellfish washer of claim 9 wherein said bouyant means have like dimensions.

11. The shellfish washer of claim 1 wherein said carrying means includes inwardly extending tabs located adjacent to said openings.

12. The shellfish washer of claim 1 wherein said carrying means includes a plurality of flat surfaces defined by the interior of the container.

13. A bivalve mollusk washer particularly suited for washing mussels, for use in conjunction with a body of water comprising:
   a circular cross-sectional drum, said drum having a plurality of openings formed within its arcuate surface for communicating with said body of water, said openings sized to retain said mussels within said container and allow water and abraded debris from the shells of the mussels to pass through the openings and into the body of water;
   means attached to opposing ends of said drum comprising buoyant material for supporting said drum relative to said body of water so that said drum is only partly submerged within said water;
   a crank attached centrally to one end of said drum adapted for rotating said drum about the axis of said drum when said drum is supported within said body of water;
   a plurality of inwardly extending vanes, said vanes attached to and extending from the interior arcuate surface of said drum and adapted to carry the mussels partly up the side of the drum when the container is rotated, the mussels being lifted up and then dropped back down onto other mussels within the drum thereby causing said mussels to be cleaned by the mutual abrading action within the rotating drum and allowing abraded debris to pass through said openings into the body of water.

14. The washer of claim 13 wherein said crank comprises a manually actuated rotatable crank.

15. A method for cleaning shellfish, particularly bivalve mollusks such as mussels, comprising the steps of:
   providing a rotatable container, said container having an interrupted interior surface for causing objects placed therein to be drawn partially up the side of said container when said container is rotated;
   depositing said shellfish within said container;
   supporting said container relative to a body of water by floating said container with sufficient buoyancy so that said container, which has a plurality of holes for fluid communication with said water, is only partly submerged within said water;
   rotating said container with means providing said buoyancy about an axis;
   tumbling said shellfish within said container by the interaction of said interrupted interior surface with said shellfish thereby causing said shellfish to be cleaned by mutual abrasion; and
   removing said cleaned shellfish from said container.

16. The method according to claim 15 wherein said rotating step includes the step of rotating said container about an axis generally parallel to the surface of the basin of water.

17. The method according to claim 15 wherein said rotating step includes the step of manually rotating said container.

18. The method according to claim 15 wherein said supporting step includes the step of rotatably mounting said container within a tank of water.

* * * * *